Oct. 1, 1963     D. P. PORADUN     3,105,664
VENT PIPE SUPPORT HOLDER

Filed Feb. 21, 1958     3 Sheets-Sheet 1

Daniel Pardon Poradun, INVENTOR.

Daniel Pardon Poradun, INVENTOR.

BY

Oct. 1, 1963         D. P. PORADUN         3,105,664
                  VENT PIPE SUPPORT HOLDER
Filed Feb. 21, 1958                    3 Sheets-Sheet 3

Daniel Pardon Poradun,
INVENTOR.
BY

United States Patent Office 3,105,664
Patented Oct. 1, 1963

3,105,664
VENT PIPE SUPPORT HOLDER
Daniel Pardon Poradun, 609 S. Main St., Minot, N. Dak.
Filed Feb. 21, 1958, Ser. No. 716,799
1 Claim. (Cl. 248—56)

This invention relates to installations of vent pipes used particularly in combination with gas furnaces in building structures, and in particular circular or elliptical supports positioned in walls or in openings through walls, floors, and the like whereby hot vent pipes or flues are spaced from inflammable materials such as used in walls, floors, and other parts of building structures.

The purpose of this invention is to provide a spacing device for supporting vent pipes from materials of walls, floors, and the like through which the pipes extend.

Various types of brackets and other devices have been provided for holding vent pipes in openings through floors, walls, roofs, and the like, however, conventional devices for this use are comparatively complicated and costly, and in most cases such devices require an expert to make the installation. Furthermore, because of the design previously used, relatively heavy materials have been resorted to, and such materials are objectionable in small building construction.

With these thoughts in mind this invention contemplates vent pipe supporting devices which, because of their construction and design, use relatively light weight materials, and are formed to be installed by the average layman.

The object of this invention is, therefore, to provide a vent pipe support that is readily secured around the vent pipe, and that is easily installed in an opening in a floor, wall, roof, or the like.

Another object of the invention is to provide a vent pipe support that may be supplied in different designs to accommodate vent pipes of different sizes and shapes and also different types of installations.

Another important object of the invention is to provide a vent pipe support in which the pipe is held by a plurality of spring fingers which make it possible to adjust the position in relation to a mounting plate or other mounting device.

A further object of the invention is to provide a vent pipe support that holds the pipe in spaced relation to the material of a floor, wall, or the like around the opening through which the pipe extends.

A still further object of the invention is to provide a vent pipe holder that may also include a protecting sleeve providing a double wall, in which the holder is of a simple and economical construction.

Still another object of this invention is the provision of an air space to permit circulation of air past the vent holder thereby eliminating the danger of trapped hot air.

With these and other objects and advantages in view the invention embodies spaced fingers extended from a sheet of material or band, with projecting ends of the fingers extended from a sheet of material connected by a band forming a clamp, and, for some uses, with a protecting sleeve extended around the spring fingers.

Other features and advantages of the invention will appear from the following description taken in connection with the drawings, wherein.

Figure 1:
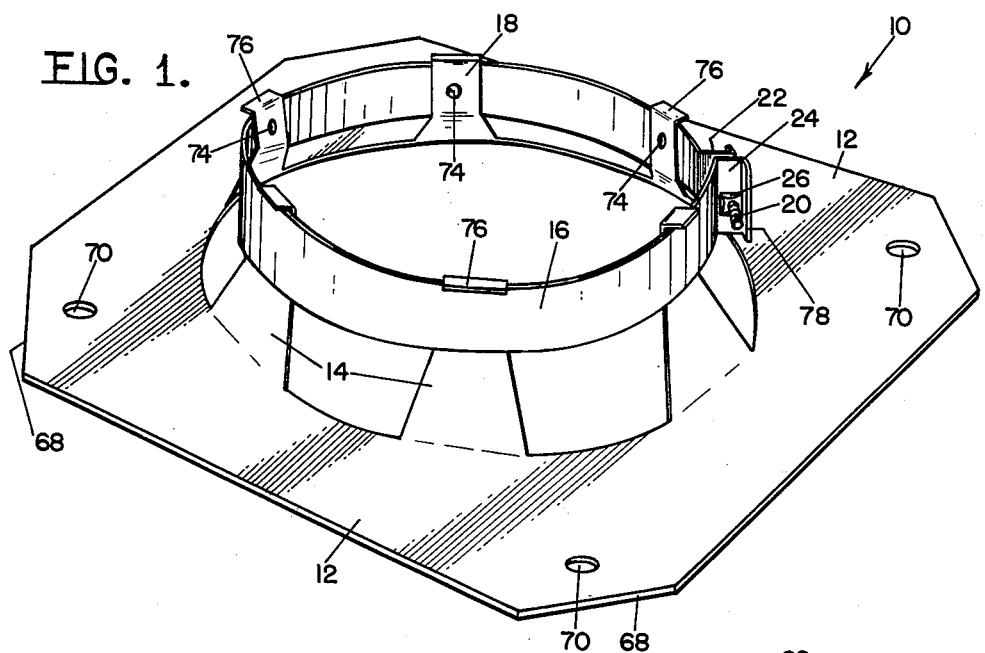
FIGURE 1 is a view showing a vent pipe holder in which projecting ends of fingers extended from a sheet of material are connected by a band having flanged ends drawn together by a screw and nut forming a clamp.

While several embodiments of the invention are illustrated in the above-referred-to drawings it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a mounting plate having spaced fingers 14 extended therefrom, and numeral 16 a band connected to projecting portions 18 of the fingers and having a bolt 20 extended through flanges 22 and 24 on the ends of the band and provided with a nut 26 whereby the flanges are drawn together for clamping the fingers to the outer surface of a vent pipe or flue.

Figure 2:
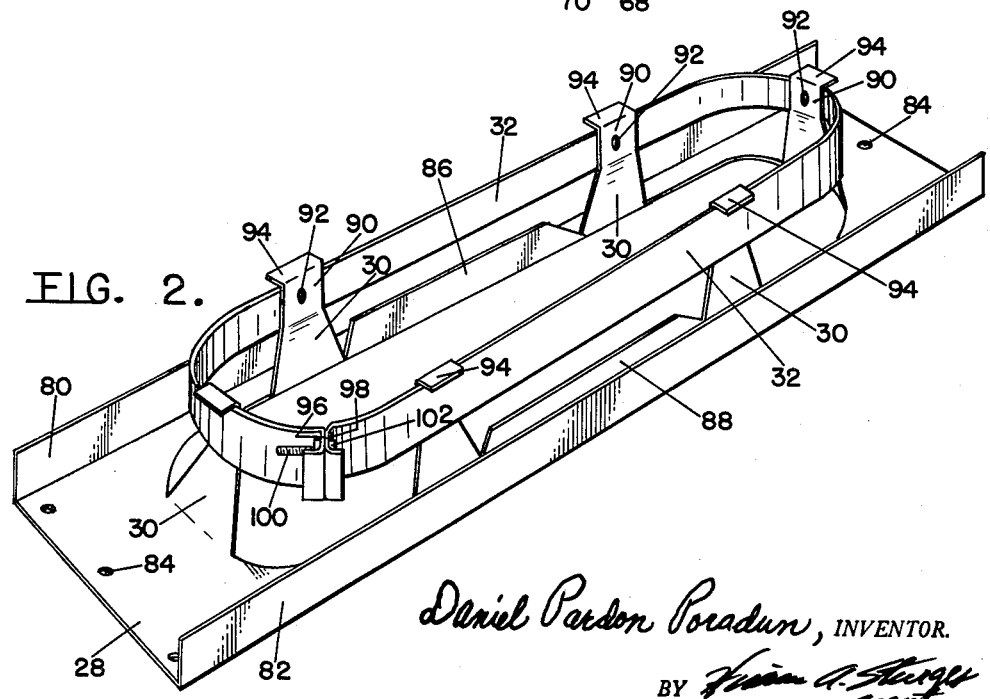
FIGURE 2 is a view similar to that shown in FIGURE 1, showing a modification wherein the holder is elongated or of elliptical shape.

In the design shown in FIGURE 2 a channel-shaped plate 28, similar to the plate 12 is provided with spaced fingers 30, the projecting ends of which are secured to a band 32, similar to the band 16.

Figure 5:
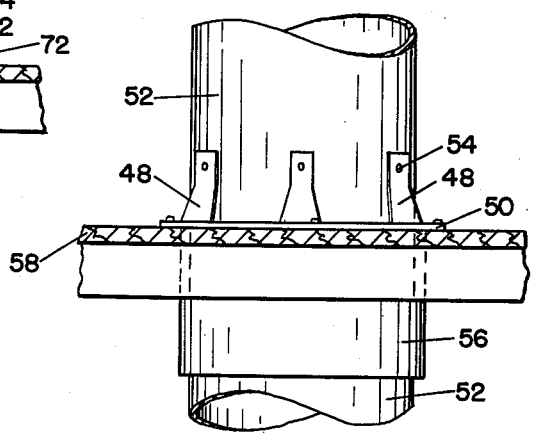
FIGURE 5 is a view showing another installation wherein a vent pipe is supported in an opening in a wall by a holder of the type illustrated in FIGURE 4.

In FIGURE 5 the clamping band is omitted and the ends of fingers 48 which extend from a mounting plate 50, similar to the mounting plate 12 shown in FIGURE 1, are secured to the wall of a vent pipe 52 by rivets 54, or the like. In this design a sleeve 56 extends through the opening in a horizontal building surface or floor 58 from the mounting plate 50, providing a double wall through the floor.

Figure 4:
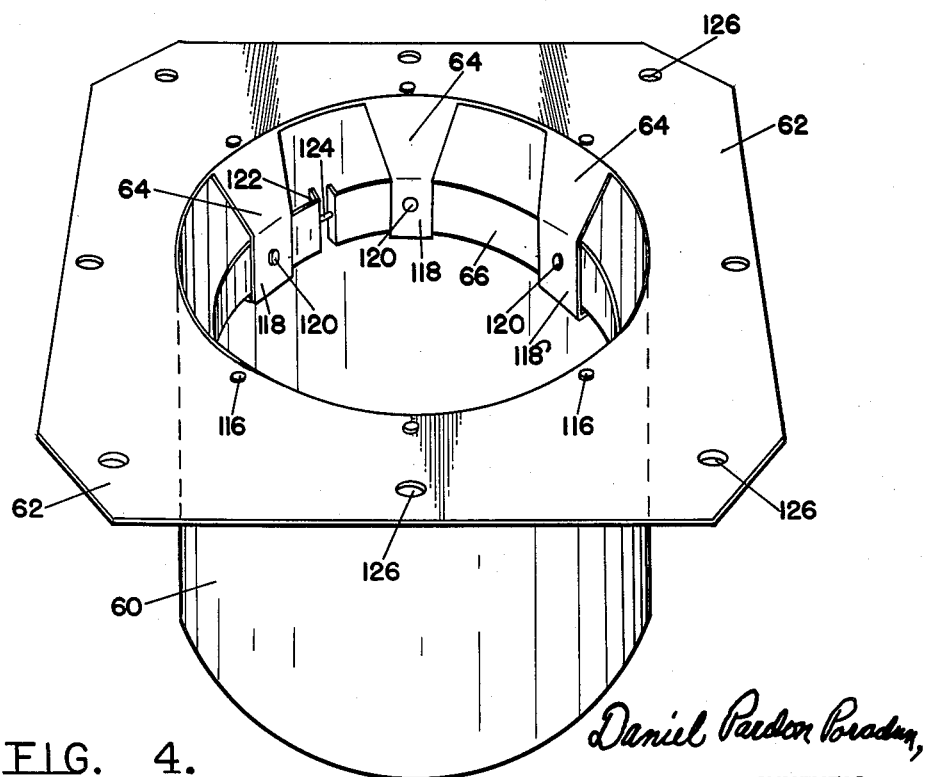
FIGURE 4 is a view showing another modification wherein a sleeve is positioned around the fingers of the design shown in FIGURE 1.

In FIGURE 4 a protecting sleeve 60, similar to the sleeve 56, extends from the mounting plate 62 and spaced fingers 64 and a clamping band 66 are surrounded by the sleeve.

The parts may, therefore, be arranged in different positions depending upon the use for which the vent pipe holder is desired.

Although it is preferred to make the parts of the vent pipe holder of sheet metal, and particularly metal of from 26 to 16 gage, the parts may be made of any suitable material and the material may be of any thickness desired.

Figure 3:
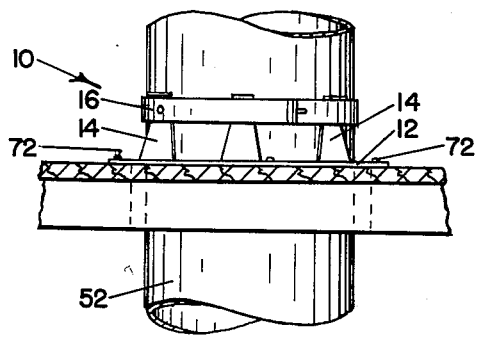
FIGURE 3 is a view illustrating a typical installation wherein a vent pipe extending through a floor is supported by a holder of the type shown in FIGURE 1.

The mounting plate 12, shown in FIGURES 1 and 3, is formed with beveled corners 68 and openings or holes 70 in the plate are provided to receive bolts or screws 72. The end portion 18 of one selected finger diametrically opposed to the clamp openings is secured to the band 16 by a rivet or other fasteners 74, or the end portion may be welded to the band. Having one finger only attached to the band permits the support to be flexible and responsive to adjustment. The upper ends of the fingers are provided with flanges 76 which extend over the band 16, and the extended ends of the flanges 22 and 24 are also provided with flanges 78.

The mounting or channel-shaped plate 28, of the design shown in FIGURE 2 is provided with side flanges 80 and 82, and the ends are provided with openings 84 that are positioned to receive screws or bolts for attaching the holder to a floor, wall, ceiling, or the like, or for securing the holder in a wall, as may be desired. The intermediate part of the plate is reinforced with flanges 86 and 88, and upper portions 90 of the fingers 30 are secured to the band 32 by rivets 92, as shown, or the parts may also be welded. The upper ends of the fingers 30 are provided with flanges 94 which locate the band in relation to the plate 28, and the ends of the band 32 are provided with flanges 96 and 98 through which a bolt 100 having a nut 102 thereon extends. The vent pipe holder may, therefore, be made circular or elliptical or of any other suitable shape.

The mounting plate 62, shown in FIGURE 4, is similar to the mounting plate 12, shown in FIGURE 1, except that the positions of the parts are inverted and positioned in the upper end of a sleeve 60, the upper end of which is secured to the plate 62 by screws 116. The extended ends of the fingers, as indicated by the numeral 118, are secured to the band 66 by rivets 120, or the like, and the ends of the band are provided with flanges 122 that are drawn together by a bolt 124. The plate 62 is also provided with bolt holes or openings 126 by which the holder may be secured in a wall 128 by bolts 130, with the sleeve 60 extended through the wall, as shown in FIGURE 6.

For installation convenience an aperture may be disposed through the sleeve 60 adjacent the flange 122 so that a screw driver or other hand tools may be utilized from outside the said sleeve.

The vent pipe holder shown in FIGURE 5 is similar to that shown in FIGURE 4 except that the fingers extend upwardly and are directly connected to the vent pipe, and the clamping band is omitted.

Figure 6:
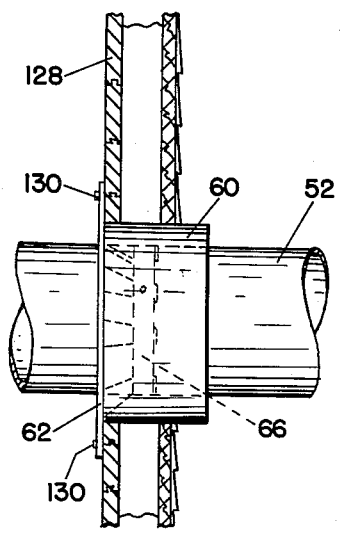
FIGURE 6 is a view showing another type of installation and illustrating a further modification wherein a vent pipe holder of the type shown in FIGURE 4 is turned in the opposite direction with the protecting sleeve extended downwardly through a floor and the fingers extended upwardly, and in which the clamping band around the projecting ends of the fingers is omitted.

In use the vent pipe holder is positioned in an opening in a floor, as shown in FIGURE 3, with the vent pipe extended through the opening, or in a wall as shown in FIGURE 6, and in all installations the distance between the outer surface of the vent pipe and the edge of the opening in the floor or wall must be not less than one inch.

The vent pipe holder, therefore, retains a vent pipe in the center of an opening through a wall, floor, roof, or the like and with the parts as illustrated and described the device may readily be clamped or otherwise secured to a vent pipe, and the mounting plate secured to a floor, wall, roof, or the like by the average workman.

It will be seen that the flanges 76 of FIGURE 1 or 94 of FIGURE 2 form a means for preventing the respective band 16 or 32 from slipping past the extended ends of the fingers 14. It will also be seen that the rivets 74 and 92 also, if used, serve this same purpose of preventing this slipping.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and arrangement of details and parts, such as come within the purview of the invention claimed may be resorted to in actual practice, if desired.

Having now described the invention that which is claimed to be new and desired to be procured by Letters Patent is:

In a flue holder, the combination which comprises a mounting plate having an opening therethrough, tapering fingers having flue engaging portions at the outer ends extended from the inner edge of the plate and positioned around said opening, flanges extended outwardly from outer ends of the fingers, a band extended around said fingers and positioned against outer surfaces thereof, the ends of the band being provided with outwardly extended flanges, a bolt having a nut thereon extended through the outwardly extended flanges at the ends of the band, and a sleeve extended from the mounting plate and extended over the fingers and band providing a cover therefor.

References Cited in the file of this patent
UNITED STATES PATENTS

| | | |
|---|---|---|
| 976,015 | Walker | Nov. 15, 1910 |
| 1,042,085 | Clawson | Oct. 22, 1912 |
| 1,127,844 | Anderson | Feb. 9, 1915 |
| 1,248,207 | Tyner | Nov. 27, 1917 |
| 1,421,359 | Barr | July 4, 1922 |
| 1,864,086 | Monroe | June 21, 1932 |
| 2,679,993 | Christophersen | June 1, 1954 |